(12) United States Patent
Okura

(10) Patent No.: US 10,648,954 B2
(45) Date of Patent: May 12, 2020

(54) LIQUID CHROMATOGRAPH METHOD, INFORMATION PROVISION METHOD, AND LIQUID CHROMATOGRAPHIC AUXILIARY APPARATUS

(71) Applicant: Yamazen Corporation, Osaka-shi, Osaka (JP)

(72) Inventor: Kihachiro Okura, Osaka (JP)

(73) Assignee: YAMAZEN CORPORATION, Osaka (JP)

(*) Notice: Subject to any disclaimer, the term of this patent is extended or adjusted under 35 U.S.C. 154(b) by 0 days.

(21) Appl. No.: 15/402,461

(22) Filed: Jan. 10, 2017

(65) Prior Publication Data

US 2017/0199165 A1    Jul. 13, 2017

(30) Foreign Application Priority Data

Jan. 12, 2016 (JP) ................................ 2016-003208

(51) Int. Cl.
*G01N 30/04* (2006.01)
*G01N 30/02* (2006.01)
*G01N 30/94* (2006.01)

(52) U.S. Cl.
CPC ............ *G01N 30/04* (2013.01); *G01N 30/94* (2013.01); *G01N 2030/027* (2013.01)

(58) Field of Classification Search
CPC ................................ G01N 30/04; G01N 30/94
See application file for complete search history.

(56) References Cited

U.S. PATENT DOCUMENTS

| 7,169,308 B2 * | 1/2007 | Ohkura ............... G01N 30/34 210/143 |
| 2003/0102265 A1 | 6/2003 | Gandelheid et al. |
| 2004/0164024 A1 | 8/2004 | Gandelheid et al. |

(Continued)

FOREIGN PATENT DOCUMENTS

| JP | S59-15855 A | 1/1984 |
| JP | 3423707 B1 | 4/2003 |

(Continued)

OTHER PUBLICATIONS

Pietrogrande, MC et al., Retention Behaviour of β-Carbolines in Normal-Phase Chromatography, Journal of Chromatography A, Jun. 2, 1989, vol. 471, pp. 407-419.

*Primary Examiner* — Christine A Enad
(74) *Attorney, Agent, or Firm* — Polsinelli PC

(57) ABSTRACT

An object of the present disclosure is to find a method in which a result of liquid chromatography can be predicted with high accuracy for a wide range of a mixing ratio of solvents by utilizing a result of thin-layer chromatography. A liquid chromatography method for separating a mixture of two or more kinds of compounds, comprising the following steps:
 (1) performing thin-layer chromatography or column chromatography in a mixed solvent of two or more kinds of solvents having a different mixing ratio from each other or a single solvent;
 (2) creating a relational expression between a mixing ratio and an elution degree of a solvent for each compound in a sample based on a result of the step (1); and
 (3) determining an optimum condition based on the relational expression, and performing liquid chromatography.

14 Claims, 12 Drawing Sheets

(56) References Cited

U.S. PATENT DOCUMENTS

| | | | | |
|---|---|---|---|---|
| 2006/0231471 | A1* | 10/2006 | Ohkura | G01N 30/34 |
| | | | | 210/198.2 |
| 2008/0230479 | A1* | 9/2008 | Suzuki | B01D 15/166 |
| | | | | 210/658 |
| 2012/0166098 | A1 | 6/2012 | Mccreary et al. | |
| 2013/0032520 | A1* | 2/2013 | Okura | B01D 15/166 |
| | | | | 210/198.2 |
| 2013/0128265 | A1* | 5/2013 | Zhao | G01J 3/4412 |
| | | | | 356/301 |
| 2013/0156893 | A1* | 6/2013 | Han | A23L 1/2128 |
| | | | | 426/72 |
| 2014/0138916 | A1* | 5/2014 | Wright | B61K 7/20 |
| | | | | 273/359 |
| 2015/0268203 | A1* | 9/2015 | Asano | G01N 30/72 |
| | | | | 250/288 |

FOREIGN PATENT DOCUMENTS

| | | |
|---|---|---|
| JP | 2005-512029 A | 4/2005 |
| JP | 2007-163153 A | 6/2007 |
| JP | 2009-168579 A | 7/2009 |
| JP | 2013-518286 A | 5/2013 |
| WO | WO 03/047717 A1 | 6/2003 |
| WO | WO 2008/062495 A1 | 5/2008 |
| WO | WO 2011/094264 A1 | 8/2011 |

* cited by examiner

Test tube in which some compounds are mixed (A)                                    (B)

STEP1                                  STEP1

STEP2                                  STEP2

LIQUID CHROMATOGRAPH METHOD, INFORMATION PROVISION METHOD, AND LIQUID CHROMATOGRAPHIC AUXILIARY APPARATUS

CROSS REFERENCE TO RELATED APPLICATIONS

This application claims priority to Application No. 2016-003208 filed in Japan on Jan. 12, 2016 under 35 U.S.C. § 119. The entire contents of this application are hereby incorporated by reference.

TECHNICAL FIELD

The present disclosure relates to a liquid chromatograph method, an information provision method, and a liquid chromatographic auxiliary apparatus.

BACKGROUND OF THE DISCLOSURE

In liquid chromatography, a solution in which a sample has been dissolved is allowed to pass through a stationary phase filled in a column. At this time, for each component in the sample introduced into the column, it takes a different time to pass through the column depending on the interaction with the stationary phase, the affinity for a mobile phase, or the like, and therefore, each component is separated at the time point when the components are discharged from the column. A substance that strongly interacts with a stationary phase, or has weak affinity for a mobile phase stays long in a column and discharged slowly from the column.

In such a liquid chromatography, selection of the solvent species, and selection of the column size are important, and the elution time and the separation degree of a sample are closely related to these conditions. Therefore, if the test results are predicted before actually performing the liquid chromatography, the efficiency of the experiment can be improved.

There is thin-layer chromatography (TLC) that is performed based on the same principle as that in the liquid chromatography. In the thin-layer chromatography, onto a material to be used as a stationary phase in a column, which is a thin layer, a sample is dropped, and then, this thin layer is immersed in an eluent that is to be a mobile layer. Further, by the action of sucking up the sample together with the eluent being sucked up in the thin layer due to capillarity, the mobility $R_f$ of the sample for the eluent can be determined. It is known that there is a correlation between the mobility $R_f$ thus determined by TLC which is performed with an eluent having an arbitrary solvent ratio, and the elution time of liquid chromatography.

The present applicant has filed Patent Document 1 for a control device of liquid chromatography, in which a result of liquid chromatography is predicted in advance based on the result of TLC by utilizing the correlation obtained between the result of TLC and the separation degree of liquid chromatography, and liquid chromatography is efficiently performed by the prediction.

In Patent Document 1, as to the relationship between the mobility $R_f$ and the mixing ratio (B/A) of solvents, approximate processing based on a linear function is performed. From the point of predicting the result of liquid chromatography from the result of TLC by such an approximation, Patent Document 1 is extremely useful for industrial purposes.

In addition, the present inventors further improved Patent Document 1 in Japanese Patent Application No. 2015-152510, and developed a technique with regard to performing the prediction of liquid chromatography based on the relationship between log k' and log B.

However, depending on a sample, there was a case where in the method described above, the prediction performed based on the result of thin-layer chromatography was inconsistent with the result of the actual liquid chromatography. In such a case, a chromatography method by the methods as in the prior art documents does not function well, and a result as predicted cannot be obtained.

Accordingly, investigation with regard to a prediction method for a result of liquid chromatography based on a result of thin-layer chromatography, which can apply to even such a case, has been required.

PRIOR TECHNICAL DOCUMENTS

Patent Documents

Patent Document 1: Japanese Patent No. 3423707

SUMMARY OF THE INVENTION

Problem to be Solved by the Invention

In view of the above, an object of the present disclosure is to find a method in which a result of liquid chromatography can be predicted with high accuracy for a wide range of a mixing ratio of solvents by utilizing a result of thin-layer chromatography or column chromatography.

That is, according to this, an object of the present disclosure is to provide a liquid chromatograph method in which efficient liquid chromatography can be performed.

Means for Solving Object

The present disclosure relates to a liquid chromatography method for separating a mixture of two or more kinds of compounds, including the following steps:

(1) performing thin-layer chromatography or column chromatography in a mixed solvent of two or more kinds of solvents having a different mixing ratio from each other or a single solvent;

(2) creating a relational expression between a mixing ratio and an elution degree of a solvent for each compound in a sample based on a result of the step (1); and (3) determining an optimum condition based on the relational expression, and performing liquid chromatography.

The determination of the optimal condition in the step (3) is preferably performed by calculating an elution time and a separation degree from the relational expression obtained in the step (2).

The thin-layer chromatography is preferably two-dimensional development type thin-layer chromatography.

It is preferred that the relationship between a mixing ratio and an elution degree of a solvent creates, based on a result of thin-layer chromatography or column chromatography, a relational expression between a mixing ratio of an eluent or a gradient pattern of a mixing ratio of an eluent, and an elution time, represented by the following formula (1):

$$\log k' = a \log B + b \tag{1}$$

(wherein k' is a relative retention calculated by the following formula (2):

$$k' = (t_R - t_0)/t_0 \tag{2},$$

B: a solvent ratio, and a: a constant determined by a solvent system to be used for elution).

The present disclosure also relates to an information provision method in liquid chromatography for separating a mixture of two or more kinds of compounds, including the following steps:

(1) performing thin-layer chromatography or column chromatography in a mixed solvent of two or more kinds of solvents having a different mixing ratio from each other or a single solvent;

(2) creating a relational expression between a mixing ratio and an elution degree of a solvent for each compound in a sample based on a result of the step (1); and (3) providing information concerning chromatography based on the relational expression.

In the step (3), it is preferred that a selectivity factor α represented by $\alpha = k'_1/k'_2$ is calculated, and result predictive information of chromatography is provided based on the selectivity factor α.

The present disclosure also relates to a liquid chromatographic auxiliary apparatus, including a calculation formula creation part creating a relationship between a mixing ratio and an elution degree of a solvent for each compound in a sample based on a result of thin-layer chromatography or column chromatography performed in a mixed solvent of two or more kinds of solvents having a different mixing ratio from each other or a single solvent; and a liquid chromatography result prediction part determining an optimum condition of liquid chromatography based on a result of the calculation formula creation part.

DETAILED DESCRIPTION OF PREFERRED EMBODIMENTS

Hereinafter, the present disclosure will be described in detail.

For example, in the disclosures described in Patent Document 1 and in Japanese Patent Application No. 2015-152510, a relationship between a mixing ratio and an elution degree of a solvent for each compound in a sample is created based on a result of thin-layer chromatography. However, in these disclosures, thin-layer chromatography is performed for a solvent mixing ratio of basically one kind, and an elution degree corresponding to an arbitrary mixing ratio is calculated based on the result.

Figure 1:
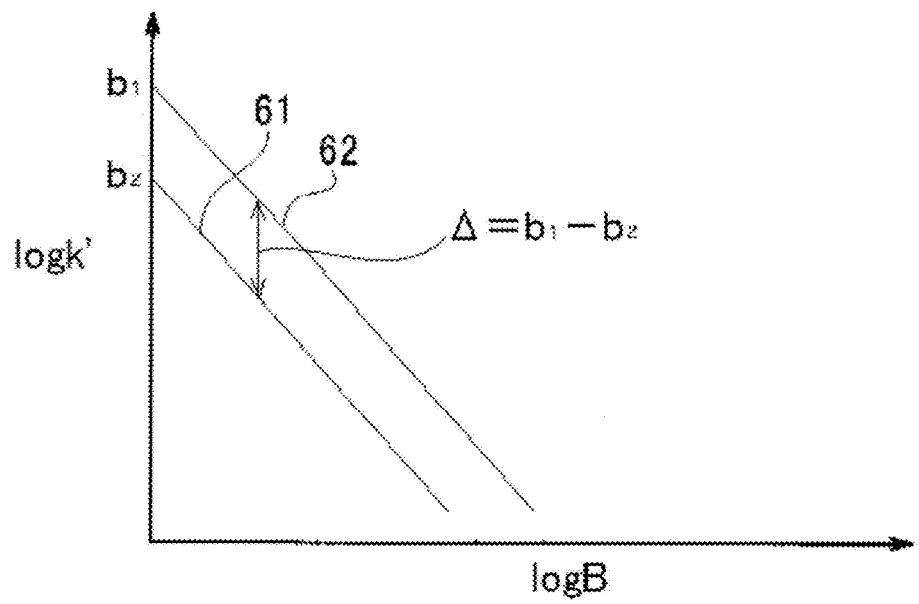
FIG. 1 is a schematic diagram showing a relationship between a solvent mixing ratio and an elution degree calculated by a conventional chromatography method, in Method 1.

That is, in the disclosures described in Cited Document 1 and in Japanese Patent Application No. 2015-152510, as shown in FIG. 1, regardless of the chemical species to be measured, by the graph showing a mixing ratio and an elution degree of a solvent, prediction of an elution result has been performed based on the premise of having the same inclination.

Such a prediction can be reasonable prediction of an elution result in many cases. However, depending on the combination of two or more kinds of compounds to be separated, there has been a case where favorable separation cannot be performed.

The present inventors investigated the cause about the case where favorable prediction cannot be performed in the disclosures in Cited Document 1 and Japanese Patent Application No. 2015-152510 as described above.

Figure 2:
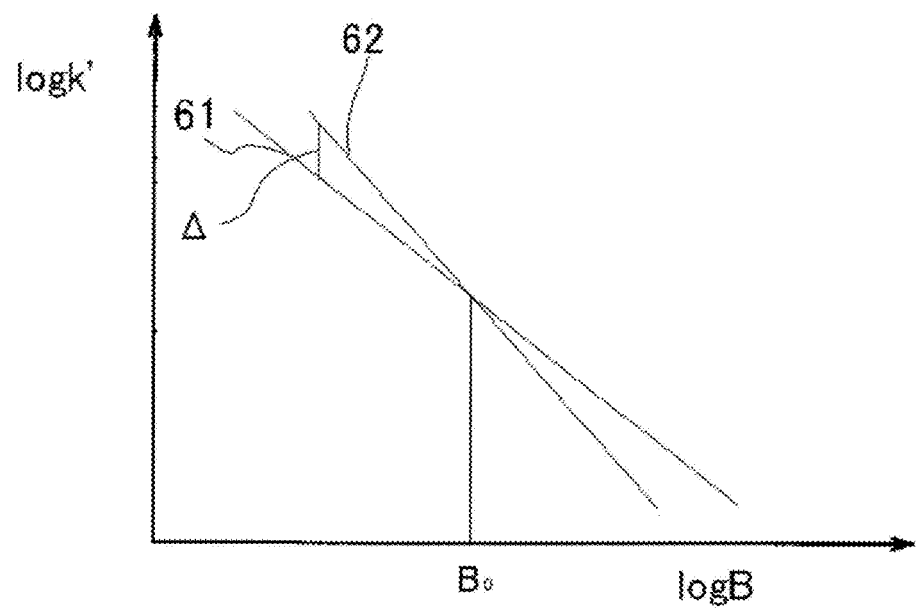
FIG. 2 is a schematic diagram showing a relationship between a solvent mixing ratio and an elution degree in a case where prediction is difficult by a conventional chromatography method, in Method 1.

As a result, it was revealed that the case where such a separation cannot be performed is a case where depending on the compounds to be separated, the inclination delicately differs from each other as shown in FIG. 2. Further, in a case of a sample having a point where two straight lines intersect, when liquid chromatography is performed at a solvent mixing ratio in the vicinity of the intersection, there is a case where the separation cannot be performed at all.

In a case of a sample having a part where two straight lines intersect, when liquid chromatography is performed at a solvent mixing ratio of, or in the vicinity of, the intersection, a satisfactory degree of separation cannot be obtained. When a result of chromatography is predicted by a method described in Patent document 1 or in Japanese Patent Application No. 2015-152510 based on only one result of thin-layer chromatography or column chromatography, the case where two straight lines intersect as shown in FIG. 2 is not supposed.

Considering such a point, in the present disclosure, thin-layer chromatography or column chromatography for a sample is performed for a mixed solvent of two mixing ratios or a single solvent, and based on these two results, a result of liquid chromatography is predicted, or the liquid chromatography is performed.

A method for performing thin-layer chromatography or column chromatography for two points of a mixed solvent or a single solvent is not particularly limited, and can be performed by an arbitrary method. Among them, two-dimensional thin-layer chromatography is most preferred.

Figure 11:
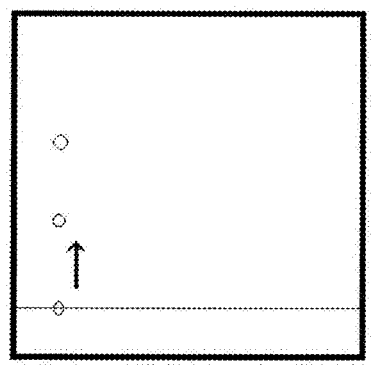
FIG. 11 is a schematic diagram showing a method of two-dimensional chromatography.
Figure 11:
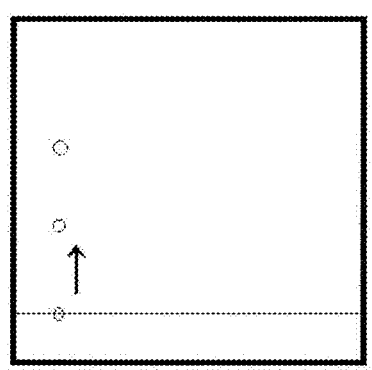
Figure 11:
Figure 11:
Figure 11:
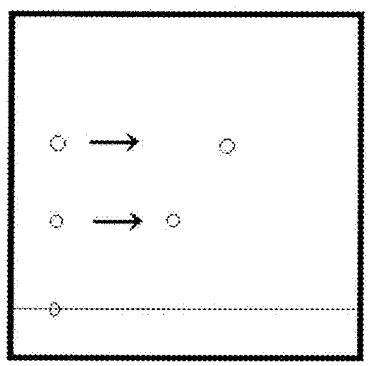
Figure 11:
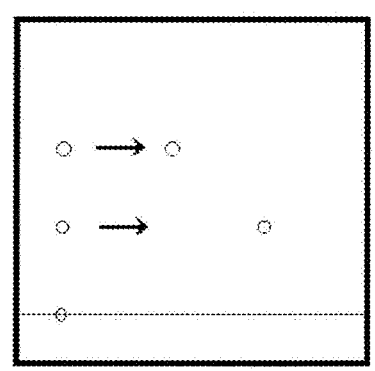
Figure 11:
Figure 11:

The two-dimensional thin-layer chromatography is a technique as described in FIG. 11. That is, sampling is performed at the corner of a thin layer plate having a square or rectangular shape, and development is performed in one direction in STEP 1 and in another direction in STEP 2 of FIG. 11.

Further, in these two stages of development, mixed solvents having a different mixing ratio from each other are used to perform the two stages of development, respectively. According to this, thin-layer chromatography can be easily performed for two kinds of mixed solvents having a different mixing ratio from each other.

In a case of the result as shown in (A) of FIG. 11, a sample, which has a large $R_f$ value in the first deployment, also has a larger $R_f$ value in the second deployment. In this case, no intersection occurs between the mixing ratios of two kinds of solvents when TLC is performed twice.

However, in a case of the result shown in (B) of FIG. 11, a sample, which has a large $R_f$ value in the first deployment, has a smaller $R_f$ value in the second deployment. In such a case, when a relationship between a mixing ratio and an elution degree of a solvent is shown, intersection of two graphs occurs between the mixing ratios of two kinds of solvents when TLC is performed twice, as shown in FIG. 2. In such a case, the sample cannot be separated in the vicinity of the intersection.

In the present disclosure, a relationship between a solvent mixing ratio and a separation degree can also be revealed by column chromatography. The column chromatography herein can be performed by measuring the elution time with the use of an ordinary column filled with a stationary phase.

From the viewpoint described above, thin-layer chromatography or column chromatography is performed for two kinds of mixed solvents, by plotting the results, a relationship between a mixing ratio and a separation degree of a solvent is clarified, and by clarifying each relationship of the compounds to be separated, the proper conditions of liquid chromatography can be known.

For example, in a case of the relationship shown in FIG. 2, the separation performance becomes deteriorated in the vicinity of $B_0$ where two straight lines intersect. In a case where the relational expression is created by the method of the present disclosure, the relational expression can correspond also to the case of FIG. 2. That is, from the graphs in FIG. 2, it becomes apparent that performing liquid chromatography at a solvent mixing ratio away from the value of the $B_0$ is desired. In addition, based on the Δ corresponding to the specific solvent mixing ratio shown in FIG. 2, the separation degree can also be evaluated.

According to this, favorable prediction of liquid chromatography can be performed rather than the conventional prediction, and the separation in liquid chromatography can be efficiently performed.

Further, in the thin-layer chromatography or column chromatography, as the stationary phase, the same filler as that in a column used for actual liquid chromatography is desirably used.

In a case where the invention of the present disclosure is performed, as to a relationship between a mixing ratio and a separation degree of a solvent, an arbitrary known method can be used, but among them, either the relational expression in the method described in Japanese Patent Application No. 2015-152510 (Method 1) or the relational expression described in Patent Document 1 (Method 2) is preferably used. These relational expressions are important expressions in performing liquid chromatography, so that by applying the method of the present disclosure as described above thereto, the prediction accuracy of liquid chromatography is improved more than before.

Hereinafter, these methods will be described, respectively.

(As to Method 1)

Japanese Patent Application No. 2015-152510 has disclosed that as to a relationship between a mixing ratio and an elution time of a solvent in liquid chromatography, the following relational expression is established:

$$\log k' = a \log B + b \quad (1)$$

(wherein $$\text{a relative retention: } k' = (t_R - t_0)/t_0 \quad (2),$$

a solvent ratio: B, and a constant determined by a solvent system to be used for elution: a).

In Japanese Patent Application No. 2015-152510, calculation is performed on the premise that the a will be the same when the solvent system is the same regardless of a compound, but in the present disclosure, calculation is performed in consideration of the variation in the a by a compound as well. The specific method in this case will be described below.

Hereinafter, the specific method for applying the present disclosure to the general formula will be described further in detail.

In Method 1, by the following formula (2):

$$k' = (t_R - t_0)/t_0 \quad (2),$$

the relative retention k' is defined.

Herein, $t_0$ is a time required for an elution solvent to pass through a specific column, or a time required for a non-retention sample to pass through a column, and is a value specific to a column, which is determined according to the size, shape or the like of a column.

The $t_R$ is an elution time required for the sample to be subjected to pass through a specific column (the same column as that in the $t_0$). Because the $t_0$ is a constant specific to a column, the sample retention not depending on the length of a column can be expressed by the k'. Further, when the k' is apparent, based on the k', the elution time $t_R$ can also be determined in a case where a column having an apparent $t_0$ is used.

In the formula (1), B is a mixing ratio of a solvent, and for example, in a case of performing liquid chromatography in a mixture system of two kinds of solvents of X and Y, is a value showing the proportion of either one of the solvents. The mixing ratio shows a constant correlation even in any one of the mole fraction (mol %), volume ratio (vol %), weight ratio (wt %), and the like, therefore, among them, an arbitrary one can be used.

In addition, in view of a mathematical theory, even when the base of a logarithm has any value, the similar relationship is established, therefore, in performing the present disclosure, the base of a logarithm may be an arbitrary one, and is not particularly limited.

In the present disclosure, a and b in the formula (1) shown by the general formula described above for each compound are determined by performing thin-layer chromatography or column chromatography for two mixed solvent ratios.

That is, the formula (1) described above may be calculated based on the $R_f$ value of thin-layer chromatography, or by measuring the $t_R$ by column chromatography. In a case of performing column chromatography, the k' can be calculated directly from the measurement result, but the measurement result of thin-layer chromatography is obtained as the $R_f$ value, therefore, the $R_f$ value is required to be converted into k'.

Hereinafter, the relationship between the $R_f$ value and the k' will be described.

In general, it is known that the relationship:

$$t_R = t_0/R_f$$

is established between the $R_f$ of thin-layer chromatography and the $t_0$ and $t_R$ in liquid chromatography.

Therefore, when the $R_f$ is measured, by using this $R_f$, the relationship between the $t_0$ and the $t_R$ becomes apparent, and by assigning the $t_0$ and the $t_R$ to the general formula (2), the k' in the general formula is obtained.

Specifically, $$k' = (1/R_f) - 1$$

is provided.

Based on the method described above, by using a relative retention k' and a solvent ratio B of thin-layer chromatography or column chromatography, which are obtained by measuring two points for a compound, the a and b can be calculated for each compound. According to this, the formula (1) can be easily obtained for each compound.

(As to Separation Degree Rs)

By using the thus calculated formula (1) corresponding to each compound, the following separation degree Rs can be calculated as an indicator of how favorably the compounds contained in a sample can be separated by specific liquid chromatography. That is, the Rs is an indicator showing how favorably the two samples can be separated by specific liquid chromatography, and by calculating the separation degree Rs, it can be confirmed whether or not the method is a separation method with which favorable separation can be performed. Therefore, this can be used as an indicator of the evaluation of a liquid chromatography method. The specific calculation method of evaluation by such a method is shown below.

As to a sample containing a compound 1 and a compound 2, from a result of thin-layer chromatography or column chromatography, $$\ln k'_1 = a_1 \ln B + b_1 \quad \text{(1-1; relational expression of compound 1), and}$$

$$\ln k'_2 = a_2 \ln B + b_2 \quad \text{(1-2; relational expression of compound 2)}$$

can be obtained. Therefore, based on the difference Δ shown in FIGS. 1 and 2, by using $$\Delta = \ln k'_1 - \ln k'_2$$
$$= \ln k'_1/k'_2$$
$$= \ln \alpha,$$

the α can be obtained.

The $\alpha = k'_1/k'_2$ is a so-called selectivity factor, and is a value showing the degree (capability) of separation of two components in a specific filler and solvent system. In a case of not being separated at all, $$k'_1 = k'_2$$

is provided, and α=1, and Δ=0 are provided.

In general, in the formula of a compound 1 and the formula of a compound 2, $a_1 = a_2$ in the same filler and the same solvent system, therefore, the two components have equal inclination, and the α is a value determined only by the difference between the $b_1$ and the $b_2$. In a case of the present disclosure, in order to expand this in a wider range, the $a_1$ and the $a_2$ are respectively calculated based on a result of thin-layer chromatography or column chromatography.

The α becomes $$\ln \alpha = \ln k'_1 - \ln k'_2 = (a_1 - a_2) \ln B + (b_1 - b_2)$$

$$\alpha = \exp[(a_1 - a_2) \ln B + (b_1 - b_2)],$$

therefore, the α can be calculated based on the relational expression for each compound.

In addition, as a separation degree Rs, by using the following formula (3)

$$Rs = (N^{1/2}/4)[(\alpha-1)/\alpha][k'/(k'+1)] \qquad (3),$$

evaluation can be performed.

Herein, N represents a theoretical plate number of a column, and α is the value described above. Further, the k' is preferably k' of either a compound 1 or a compound 2, or an average value of these compounds 1 and 2.

The thus calculated Rs becomes an indicator showing how favorably the two samples can be separated in a case of using a specific column, and using a specific mixed solvent. Therefore, based on this separation degree, the proper conditions of liquid chromatography can be explored.

In addition, based on the formula described above, elution times of $t_{r1}$ and $t_{r2}$ of each sample can be determined. According to this, the liquid chromatography conditions can be evaluated from both sides of the elution time and the separation degree, and the most suitable conditions of liquid chromatography can be known before the actual operation of liquid chromatography.

Figure 8:
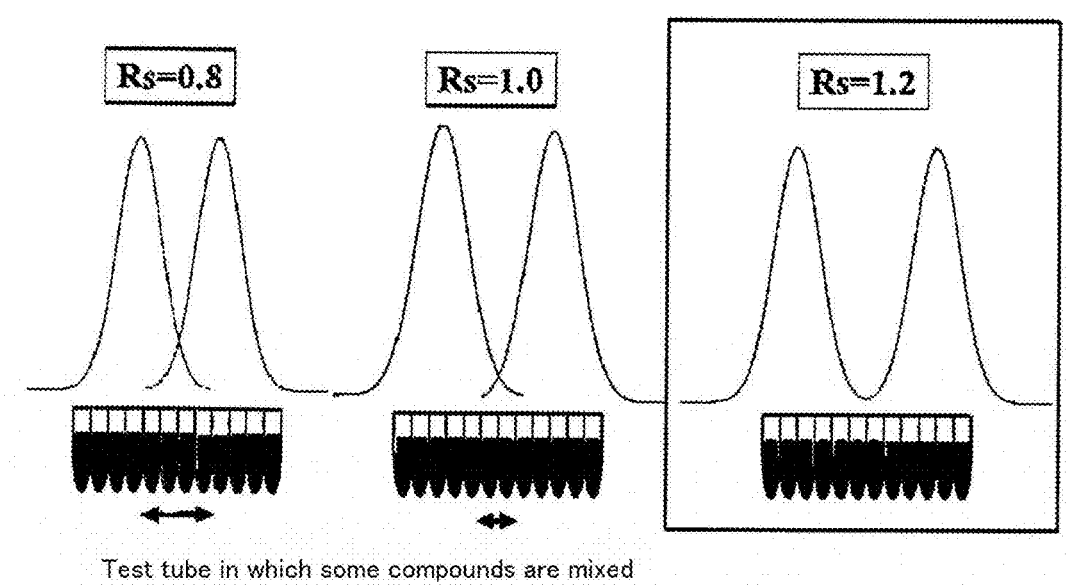
FIG. 8 is a schematic diagram showing technical significance of Rs.

Further, in order to clarify the technical significance of Rs, refer to FIG. 8.

In FIG. 8, a schematic diagram expressing a specific value of Rs and a separation state of a sample is shown.

That is, in a case of Rs=0.8, in an elution curve, before completely finishing the elution of a sample to be eluted first, a next sample starts to be eluted. Therefore, in the overlapped portion of the elution curves, among the obtained fractions, fractions containing both compounds are generated, and complete separation is not performed.

In FIG. 8, as the value of Rs becomes larger, the separation degree is improved, and in a case of Rs=1.2, there is no overlapped portion of elution curves of two samples, so that, favorable separation can be achieved. Therefore, by calculating the above-described Rs, the separation accuracy can be predicted. In particular, in the formula (3), a theoretical plate number N of a column is contained in the formula. Therefore, in selection of a column, it can be known which theoretical plate number N should be used to achieve the target Rs value, and to favorably perform the separation.

In addition, also for a relationship between a sample load amount and a used column, the decision can be made, and selection of the used column that can correspond to the load amount of a sample to be separated can also be performed.

Figure 9:
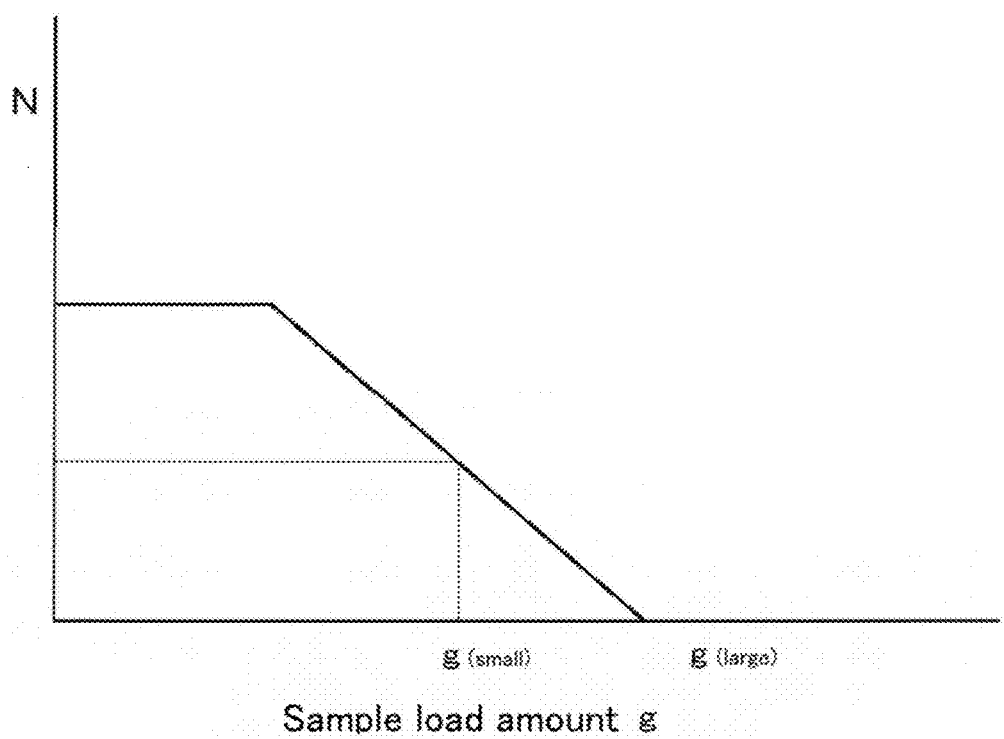
FIG. 9 is a schematic diagram showing a relationship between a sample load amount and N.

There is a relationship of FIG. 9 between the theoretical plate number N of a column and a load amount g of a sample. The graph shown in FIG. 9 shows characteristics of a specific column, and shows the maximum value of the load amount applicable in a specific column to the specific theoretical plate number N. By utilizing this relationship, the sample load amount chargeable to a column can be found (Japanese Patent No. 4680761).

In general, as a load amount of a sample is larger, use of a column with a larger size is required in order to perform the complete separation. In addition, this load amount has a relationship with the theoretical plate number N. Therefore, in specific separation, if the N becomes apparent for achieving the target separation degree Rs, the load amount capable of corresponding to this N can be revealed for each column. According to this, the column selection corresponding to the intended load amount can be performed.

Hereinafter, such a technique will be described in detail.

As described above, as long as the Rs has a value of around 1.25, sufficient separation can be achieved. In addition, by using the formula (3), a value of N in a case where the Rs becomes 1.25 can be revealed. Further, the load amount corresponding to this N can further be revealed from the relationship in FIG. 9.

Figure 10:
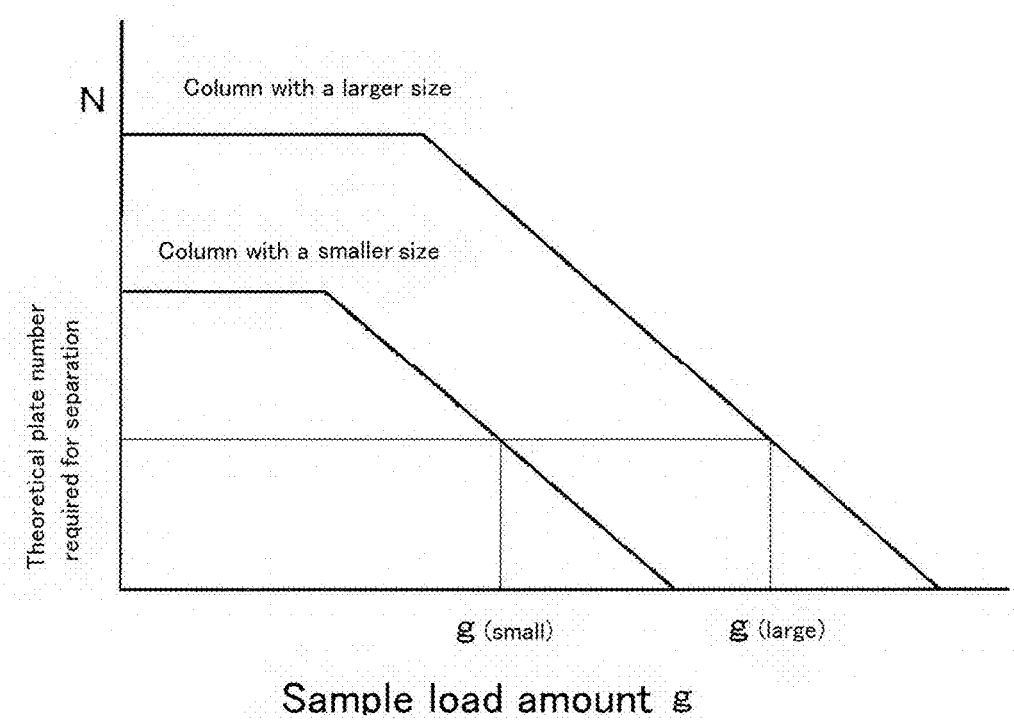
FIG. 10 is a schematic diagram showing a relationship between a sample load amount and N.

For example, in FIG. 10, characteristic graphs for two kinds of a column with a large size and a column with a small size are shown. From this relationship, the load amount with which the separation can be performed with a separation accuracy of Rs 1.25 is revealed in a case of using each column. Therefore, as long as the sample amount to be separated is apparent, the column is easily selected when the separation is performed. In addition, the load amount capable of separating a sample can also be revealed in a case where a specific column is used.

(Case of Performing Gradient in Method 1)

In liquid chromatography, there may be a case of performing separation work while performing gradient (that is, the mixing ratio of a solvent is changed with the lapse of time). The method of the present disclosure is capable of corresponding also to a case of performing such a gradient.

That is, as long as relationships of $$\ln k'_1 = a_1 \ln B + b_1 \quad \text{(1-1; relational expression of compound 1), and}$$

$$\ln k'_2 = a_2 \ln B + b_2 \quad \text{(1-2; relational expression of compound 2)}$$

for compounds 1 and 2 are apparent, based on these relational expressions, with a specific method of gradient, by calculating an elution time in a case of performing gradient, chromatography can be performed.

Hereinafter, based on FIG. 3, a case of performing gradient will be described.

Figure 3:
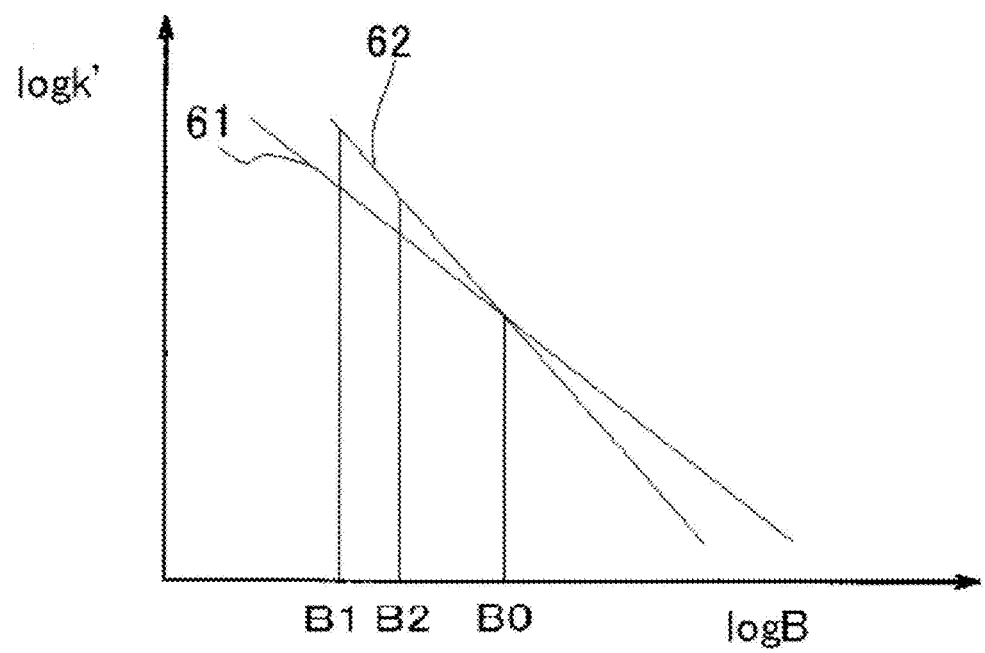
FIG. 3 is a schematic diagram showing a relationship between a solvent mixing ratio and an elution degree in a case where prediction is difficult by a conventional chromatography method, in Method 1.

In a case of FIG. 3, at a solvent mixing ratio of $B=B_0$, two graphs intersect.

In that case, it is preferred that the gradient is performed with avoiding the vicinity of the intersecting solvent mixing ratio B. That is, in a case shown in FIG. 3, it is preferred that gradient is performed by selecting the solvent mixing ratio such that the gradient is performed at a solvent mixing ratio in the range of B1 to B2. More specifically, it is preferred to select a gradient pattern, such that, by using a solvent mixing ratio of B1 as the starting point, where two graphs are more separated from each other, the gradient is performed to B2 without passing through $B_0$ or the vicinity of $B_0$.

Figure 4:
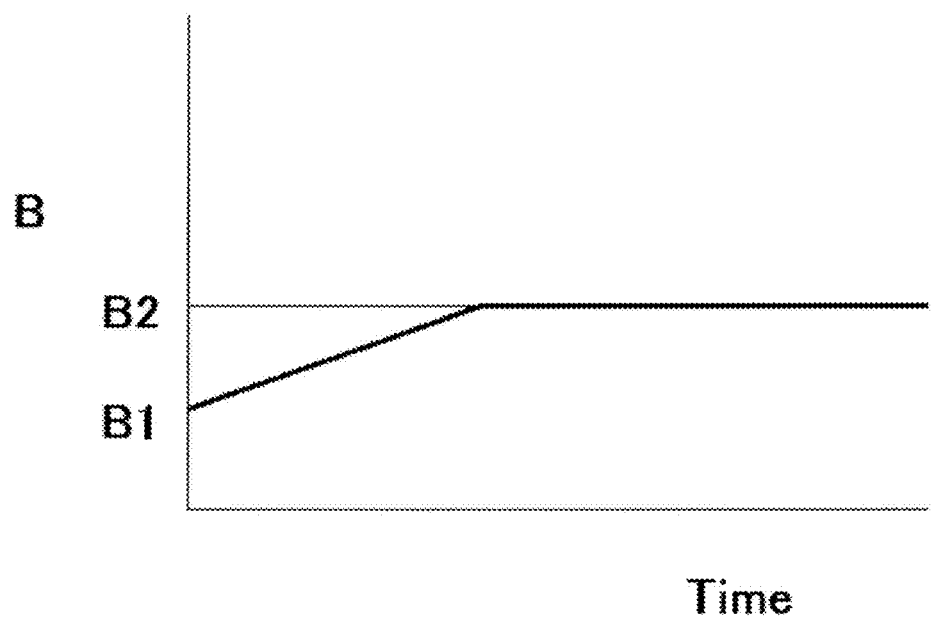
FIG. 4 is a schematic diagram showing one example of a suitable gradient method in a case where the relational expression shown in FIG. 3 is obtained.
Figure 5:
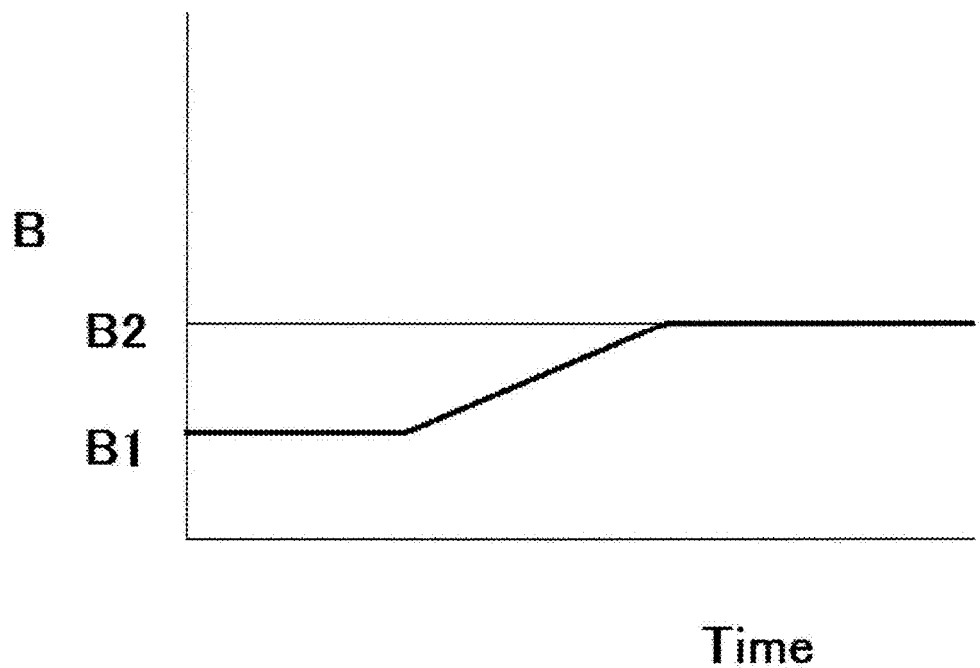
FIG. 5 is a schematic diagram showing one example of a suitable gradient method in a case where the relational expression shown in FIG. 3 is obtained.
Figure 6:
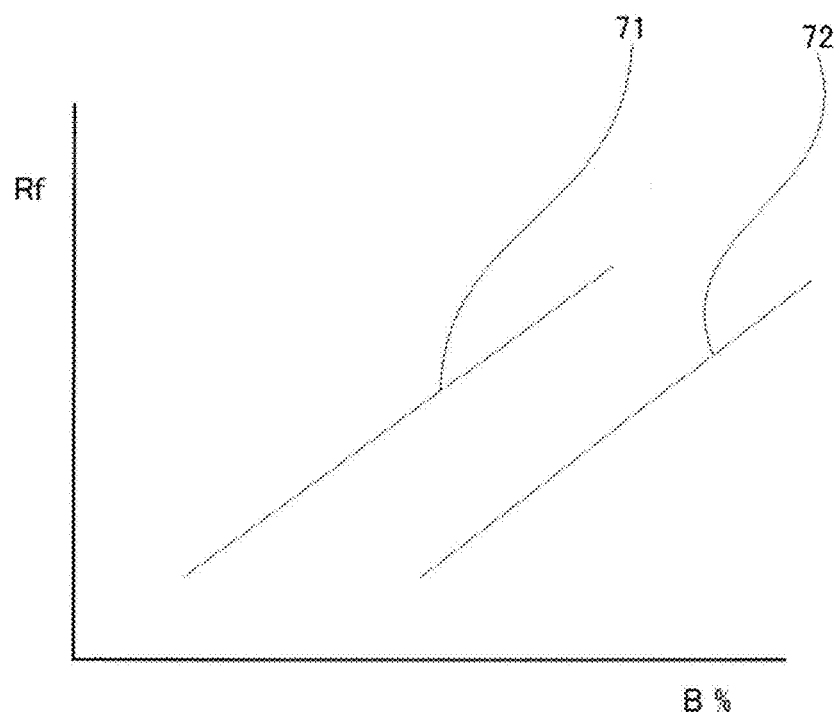
FIG. 6 is a schematic diagram showing a relationship between a solvent mixing ratio and an elution degree calculated by a conventional chromatography method, in Method 2.
Figure 7:
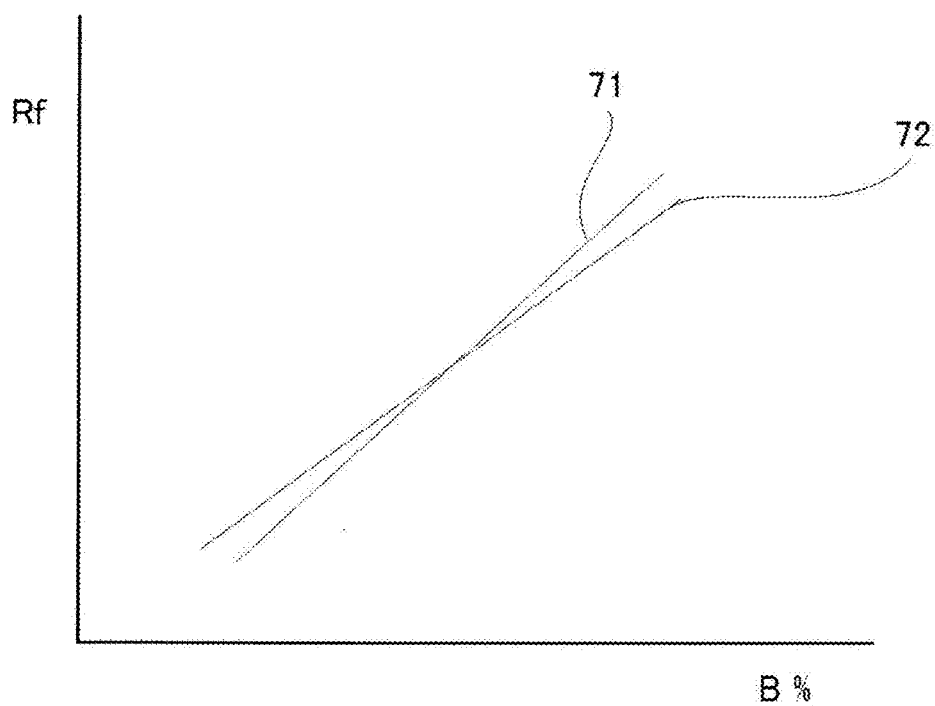
FIG. 7 is a schematic diagram showing a relationship between a solvent mixing ratio and a mobility $R_f$ in a case where prediction is difficult by a conventional chromatography method, in Method 2.

In such a case, as a suitable gradient pattern, for example, patterns shown in FIGS. 4 and 5 can be mentioned. In both of these patterns, the mixing ratio of a solvent is changed, but the gradient pattern does not pass through the vicinity of $B_0$ where two graphs are overlapped, and the solvent mixing ratio is changed in the range of B1 to B2 that is a range of a solvent mixing ratio where a certain degree of separation can be expected.

In addition, the B in the formulas (1-1) and (1-2) described above is replaced with a function of a time corresponding to a gradient method:

$$B = B(t),$$

and by integrating this with time, the elution time can be known for each sample in a case of performing gradient, as a result, the more accurate result of liquid chromatography can be predicted.

Further, the case in which such a method is effective is not limited to a case where straight lines of two compounds intersect. Even in a case of not intersecting, when difference of the inclinations is large, it is preferred that a solvent mixing ratio at which two straight lines are separated as far as possible is selected, and based on the solvent mixing ratio, the gradient method is selected.

(Correction of Difference Between TLC and Liquid Chromatography)

There may be a case where the general formula (1) obtained by the above-described TLC, and the relational expression of $k'_T$ and $B_T$ in liquid chromatography are not completely matched.

Therefore, the present inventors have investigated also with regard to the parts to correct such a difference.

As described above, in a case where a shift of the relational expression (1) that has been predicted by TLC is generated, the absolute value correction is important, but in a case where an intersection $B_0$ of two graphs is present, it is also important to perform the investigation with regard to the shift of the value of $B_0$.

Also in a case where a shift is generated between the TLC and the liquid chromatography, in many cases, as to the shift, the difference between compounds is not so large, and it can be presumed that the same degree of a shift is generated. Accordingly, if the degree of the shift is the same, $B_0$ does not differ between the TLC and the liquid chromatography. Therefore, by calculating the conditions of liquid chromatography based on the $B_0$ calculated based on a result of TLC, a favorable result can be obtained.

(As to Method 2)

Next, with regard to a prediction method as shown in Patent Document 1, a case of applying the method of the present disclosure will be described.

In Patent Document 1, by the relational expression between the $R_f$ value and the mol % of B in a mixed solvent, prediction of a result of liquid chromatography is performed. Herein, a relationship of the following formula (4):

$$R_f = aB + b \quad (4)$$

can be obtained based on thin-layer chromatography in two points.

Also in such a method, by applying the two results of thin-layer chromatography or column chromatography, in which the solvent mixing ratios are different from each other as in the present disclosure, prediction of liquid chromatography can also be performed.

Also in this case, as to a sample containing a compound 1 and a compound 2, from a result of thin-layer chromatography or column chromatography, two relational expressions of $$R_{f1} = a_1 B + b_1 \quad \text{(4-1; relational expression of compound 1), and}$$

$$R_{f2} = a_2 B + b_2 \quad \text{(4-2; relational expression of compound 2)}$$

can be determined, and the α can be determined from the following expression:

$$\alpha = (k'_1/k'_2)$$
$$= [R_{f1}(1 - R_{f2})]/[R_{f2}(1 - R_{f1})].$$

With the use of the α, Rs can be calculated by utilizing the formula (3).

Further, elution times of $t_{r1}$ and $t_{r2}$ for each component can also be determined. Furthermore, calculation of the N is performed based on the separation degree Rs, and selection of a column to be used can also be performed.

Moreover, based on these results, in the same manner as in Method 1, evaluation of a liquid chromatography method can be performed.

(Case of Performing Gradient in Method 2)

In a case where the present disclosure is applied in Method 2, also in a case where gradient is performed at a mixing ratio of a solvent, the method is essentially the same as that in the case of Method 1. That is, for each component, the above-described relational expression is created, and in a case where two straight lines intersect in the obtained relational expression, it is desired to perform the gradient in a place far from the intersecting solvent mixing ratio $B_0$, and where the value of $R_f$ has some degree of distance. In addition, when an elution time is calculated in a case of performing gradient, a relational expression regarding the time for a solvent mixing ratio is created, and by integrating this with time, a $R_f$ value can be obtained, as a result, an elution time in a case where liquid chromatography is performed based on the $R_f$ value can be obtained.

(As to Constitution of Liquid Chromatography System)

The present disclosure is to efficiently perform liquid chromatography by using the above-described calculation formula. When such a theory is practically applied to liquid chromatography, a form of an auxiliary apparatus of liquid chromatography, a control device of liquid chromatograph, and an apparatus of an executing method of liquid chromatography, a control program of liquid chromatography, or the like, may be used.

That is, a form in which based on a result of thin-layer chromatography or column chromatography, the calculation as described above is automatically performed, and by using a liquid chromatographic auxiliary apparatus, as presenting information on a liquid chromatography method to an operator, liquid chromatography is performed may be used. Such an auxiliary apparatus of liquid chromatography has a calculation formula creation part creating a relationship between a mixing ratio and an elution degree of a solvent for each compound in a sample by the above-described method based on a result of thin-layer chromatography or column chromatography, and a liquid chromatography result prediction part determining optimum conditions of chromatography based on the results of the calculation formula creation part.

Further, in addition to the above, the liquid chromatography system may be a liquid chromatography system equipped with a measured value storage part, a calculation formula creation part, a liquid chromatography result prediction part, a liquid chromatography condition determination part, and a mixing ratio control part.

Hereinafter, these parts will be described, respectively.

(Measured Value Storage Part)

The measured value storage part is a part for storing a result of thin-layer chromatography or column chromatography obtained in the above-described step (1).

Figure 12:
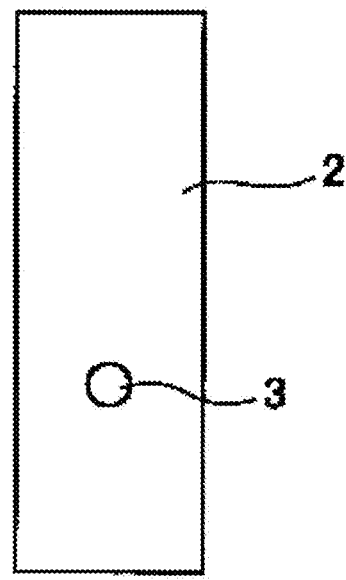
FIG. 12 is a schematic diagram showing a general method of thin-layer chromatography.
Figure 12:
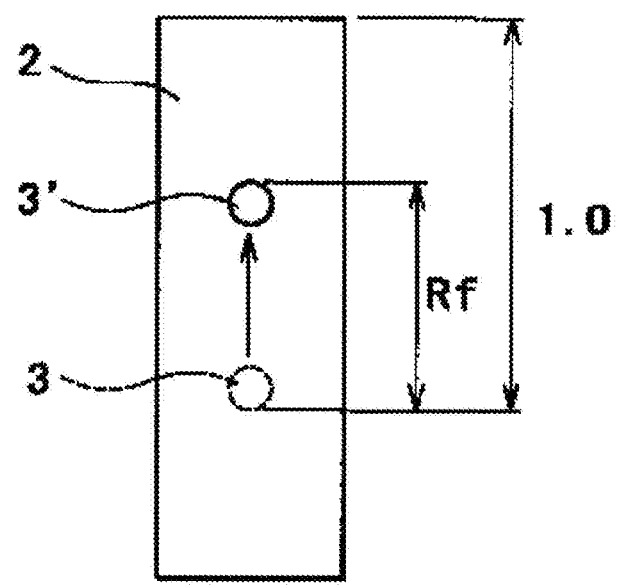

In FIG. 12, a schematic diagram of thin-layer chromatography (TLC) is shown.

In TLC, at first, as shown in FIG. 12(a), a silica gel thin layer 2 on which a sample 3 has been dropped is immersed in an eluent 4. As a result, a mixed solution 4 is sucked up into a silica gel thin layer 2 by capillarity. Along with this, the sample 3 also moves upward. When the movement of the eluent 4 and the sample 3 is finished, the sample 3 moves to a position of sample 3' as shown in FIG. 12(b). At this time, a distance from a position before the sample 3 is immersed in the mixed solution 4 to the upper end of the eluent 4 is set to 1.0, and a distance up to the sample 3' relative to the 1.0 is obtained as the mobility $R_f$.

In a case where two-dimensional thin-layer chromatography is performed, as shown in FIG. 11, development is firstly performed in one direction, and then performed in another direction. The $R_f$ value can be calculated in the similar manner. When TLC is performed by two-dimensional thin-layer chromatography, the measurement can be performed twice with a simple operation, and the correspondence relation of each spot is clear, therefore, this is preferred. Further, as shown in FIG. 2, in a case where straight lines intersect with each other, a state as shown in FIG. 11(B) is obtained, therefore, this is also preferred in that it is immediately clear whether or not these intersect.

In this case, an operator reads the $R_f$ value from a thin layer plate after the measurement, and the obtained value may be input as a numerical value, or the thin layer chromatography plate is placed on a predetermined position of an apparatus, and the $R_f$ value may be automatically read based on image analysis. In the analysis of spots, a method in which detection light such as UV rays is applied as needed, and by utilizing light emission from the detection light, the spotted positions are read, or the like can be employed.

The measured value storage part is apart for storing the $R_f$ value obtained by the thin-layer chromatography in association with a mixing ratio B of a solvent. The thus stored values are utilized for the creation of calculation formula in the following calculation formula creation part.

By measuring $t_R$ with column chromatography in place of the above-described thin-layer chromatography, k' may be calculated. In this case, column chromatography using an ordinary column is performed with a different solvent mixing ratio, and an elution time $t_R$ of an intended sample in the column is measured. Further, a measured value storage part in which by using the $t_0$ being a value specific to a column, k' is determined based on the formula (2), and such a value is stored in the measured value storage part may be used.

(Calculation Formula Creation Part)

The calculation formula creation part in the present disclosure is a part in which based on a result of the above-described thin-layer chromatography or column chromatography, a general formula (1) of a specific component for a specific solvent system is created.

The above-described calculation formula creation part may be a calculation formula creation part in which further, in consideration of the difference of mathematical formula between thin-layer chromatography and liquid chromatography, the above-described modifications are made to the mathematical formula obtained by the above-described method. Further, the calculation formula creation part may be a calculation formula creation part in which numerical values required for the calculation are stored in the calculation formula creation part. Furthermore, a general formula (3) is also created so that evaluation of a separation degree, and selection of a column can be easily performed.

(Liquid Chromatography Result Prediction Part)

When a general formula (1) is determined for all the samples for which separation is required, a situation in which a mixing ratio of an eluent, and an elution time corresponding to a column to be used can be predicted is made. In addition, for example, if graphs shown in FIG. 2 are created, based on this, an operator can easily presume the favorable mixed solvent ratio. Further, when specific conditions of liquid chromatography are input, the elution time depending on the conditions can also be presented. Furthermore, the above-described separation degree Rs can also be expressed. By referring to the information, an operator can easily determine the quality of the liquid chromatography conditions for multiple species. According to this, the optimal liquid chromatography conditions (a solvent mixing ratio, a column to be used, and the like) can be easily selected before experiments.

In such a liquid chromatography result prediction part, the above-described calculation formula is provided to an operator. Further, it is preferred that a result of liquid chromatography is predicted based on the above-described calculation formula, and the predicted result is shown on a display part so that an operator can determine the suitability of the conditions at a glance.

The creation of liquid chromatography result prediction described above can be performed by an ordinary computer, and the results can be shown on an ordinary display device represented by a liquid crystal display.

The presentation of liquid chromatography result prediction described above, for example, as shown in FIGS. 14 and 15, may be a presentation of showing an image of an elution time and a separation degree as specific numerical values, or may be a presentation of showing elution curves as shown in FIG. 8.

Further, by comparing these values corresponding to some measurement conditions, an operator can know the optimal liquid chromatography method.

In addition, in the determination of chromatography conditions, selection of a column is also an important element. As described above, in the selection of a column, the sample load amount is also an important element. That is, as the amount of a sample to be separated is larger, a larger column is required. Information required for such a purpose may be displayed as an image.

Figure 14:
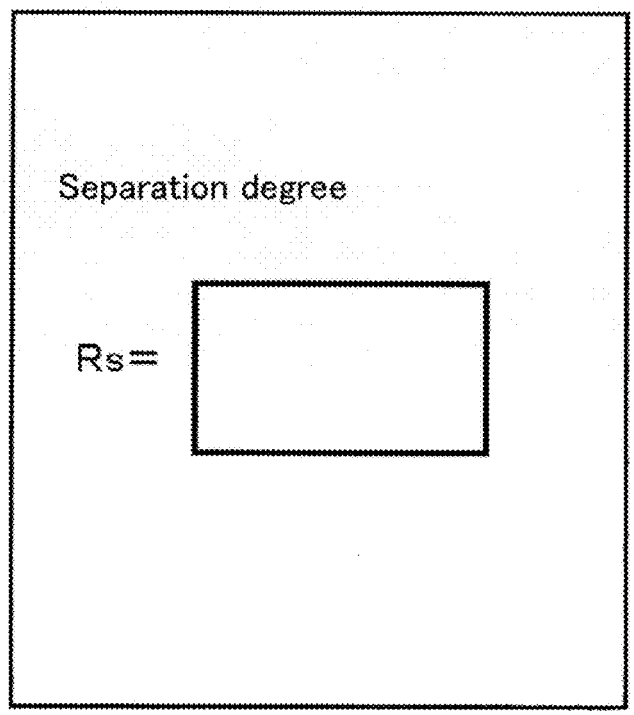
FIG. 14 is a diagram showing one example of image display of a liquid chromatography system.
Figure 15:
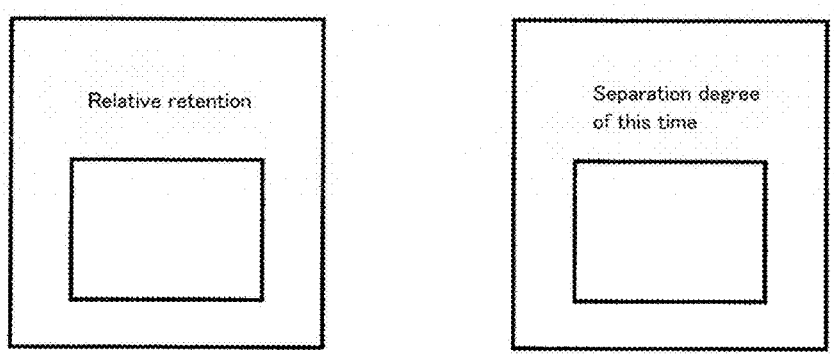
FIG. 15 is a diagram showing one example of image display of a liquid chromatography system.

That is, also as to a relationship between N and a load amount as shown in FIGS. 9 and 10, the relationship is displayed as an image, as needed, and may be used as a help when an operator selects a column. In order to provide the information as shown in FIGS. 8, 14 and 15, it is required to determine the value of N, and in order to determine the value of N, it is important to know the relationship between the N in a column to be used and the load amount as shown in FIGS. 9 and 10. Therefore, as the part to obtain the liquid chromatography result prediction, a part comprehensively having the information is preferred.

(Chromatography Condition Determination Part)

In the present disclosure, as described above, an operator evaluates the liquid chromatography conditions that are created by the operator or recommended by an apparatus while utilizing the liquid chromatography result prediction part, and finally determines the liquid chromatography conditions.

(Mixing Ratio Control Part)

The present disclosure may be a disclosure in which based on the determination by the above-described liquid chromatography condition determination part, the liquid chromatography is performed. The mixing ratio control part is a part for outputting control signals to control a mixing ratio of the eluent to be sent to a column or a gradient pattern of a mixing ratio of the eluent based on the liquid chromatography conditions that are selected by an operator based on the liquid chromatography condition determination part. Further, as the mixing ratio control part, a known part can be used, and for example, a part as disclosed in Patent Document 1 can be used.

(Control Device of Liquid Chromatograph)

Hereinafter, based on drawings, one example of the embodiments of a control device of liquid chromatograph of the present disclosure will be further described in detail. Further, the present disclosure should not be limited to the contents of the following drawings.

The present disclosure may be a disclosure relating to a control device to control liquid chromatography by each part as described above with a liquid chromatography system equipped with necessary elements, and a computer to control the liquid chromatography system.

One example of the embodiments in operating the technique as described above as an actual device will be hereinafter described in detail.

Figure 13:
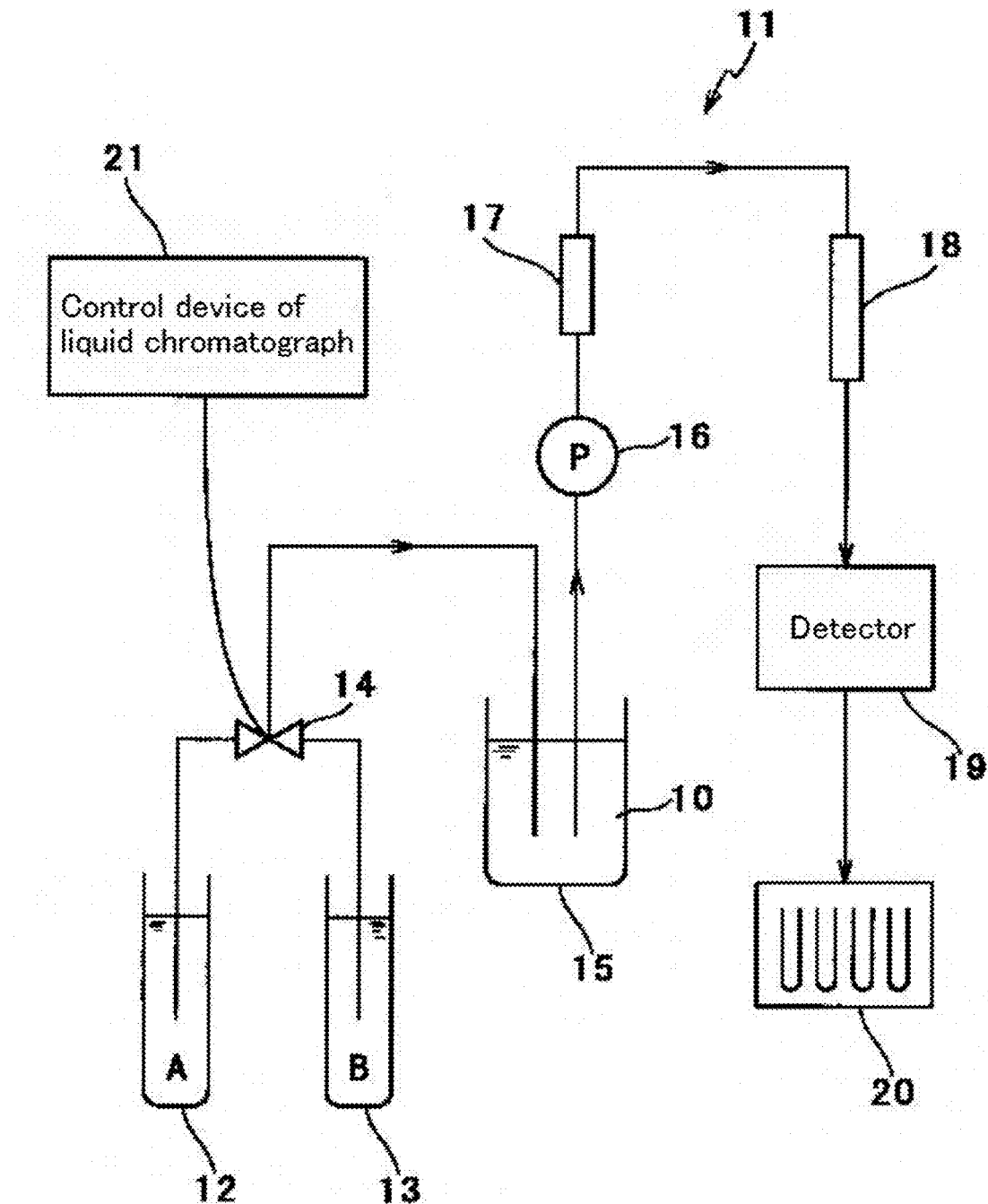
FIG. 13 is a schematic diagram showing a liquid chromatography system that can be applied for performing the present disclosure.

In FIG. 13, a liquid chromatograph system 11 is shown. In the liquid chromatograph system 11, a container 12 in which a solvent A is stored, a container 13 in which a solvent B is stored, a solenoid valve 14 arranged at a position where the solvent A and the solvent B are connected, a mixer 15 in which an eluent 4 is stored, a pump 16, an injector 17, a column 18, a detector 19, and a fraction collector 20 are arranged in this order, and a path is formed. Further, a liquid chromatograph control device 21 is connected to the solenoid valve 14.

A solvent A is stored in a container 12, and a solvent B is stored in a container 13. In addition, the number of the solvents to be used is not limited to two kinds, and may be increased depending on the use state or the intended purpose. In general, the solvent A and the solvent B are used in combination of non-polar molecules and polar molecules.

A pump 16 pumps up a solvent A and a solvent B via a container 15 and a solenoid valve 14 in a circuit of a liquid chromatograph system 11. The solenoid valve 14 selects a solvent to be pumped up from the solvent A or the solvent B with a control signal from a liquid chromatograph control device 21. The mixing ratio of the solvent A and the solvent B in the mixer 15 is determined depending on the selection time of each solvent in the solenoid valve 14. In the mixer 15, the pumped-up solvent A and solvent B are stored once, and set as an eluent 10. This eluent 10 has a calculated mixing ratio, as described later.

An injector 17 has a sample 3, and when the eluent 10 passes through the injector 17, the sample 3 is sent out. In addition, the injector 17 is not limited to one, and multiple injectors arranged side by side, which can select a path selectively, can also continuously work for multiple samples.

In a column 18, a stationary phase is filled, and when a mixed solvent 10 passes through the column, liquid chromatography is performed. As the stationary phase, silica gel that forms a silica gel thin layer plate 2 in FIG. 12 is used. In addition, the column is not limited to one, and multiple columns arranged side by side, which can select a path selectively, can also perform multiple kinds of liquid chromatography.

A detector 19 detects the results of the liquid chromatography performed in the column 18. Further, a fraction collector 20 has multiple test tubes, and depending on the analysis results of the detector 19, each component contained in the sample 3 is fractioned in each test tube.

The liquid chromatography control device is a device to control the liquid chromatography as shown in FIG. 13, and is preferably a computer having the above-described measured value storage part, calculation formula creation part, liquid chromatography result prediction part, liquid chromatography condition determination part, and mixing ratio control part in the internal hard disk, or a client computer connecting to a server in which information required for performing these parts is stored.

According to this, the above-described calculation is performed, and by controlling the liquid chromatography, favorable liquid chromatography is performed.

(Executing Method of Liquid Chromatography)

By using the above-described measured value storage part, calculation formula creation part, liquid chromatography result prediction part, liquid chromatography condition determination part, and mixing ratio control part, liquid chromatography can be executed.

The executing method of liquid chromatography as described above is a method for executing liquid chromatography by using a control device of liquid chromatograph equipped with a measured value storage part, a calculation formula creation part, a liquid chromatography result prediction part, a liquid chromatography condition determination part, and a mixing ratio control part, and a method for performing liquid chromatography by utilizing a function of each part by using such a control device of liquid chromatography.

(Control Program of Liquid Chromatograph)

The present disclosure has the above-described measured value storage part, calculation formula creation part, liquid chromatography result prediction part, liquid chromatography condition determination part, and mixing ratio control part, and is also a control program of liquid chromatography for making a computer function by these parts.

That is, each part of the above-described measured value storage part, calculation formula creation part, liquid chromatography result prediction part, liquid chromatography condition determination part, and mixing ratio control part, is generally executed by a computer. The present disclosure is also a control program for executing these parts by a computer.

EXAMPLES

Hereinafter, the present disclosure will be described in more detail by way of Examples.

Example 1: Investigation by Relational Expression of Patent Document 1

Thin-layer chromatography of caffeine and kinetin was performed at a mixing ratio (volume ratio) of ethyl acetate: methanol of 95:5 and 80:20. As a result, the obtained $R_f$ values of caffeine were 0.27 and 0.46, respectively, and the obtained $R_f$ values of kinetin were 0.23 and 0.54, respectively. The obtained results for these two samples were plotted on a graph with the $R_f$ value on the vertical axis and the ratio (=B %) of methanol having stronger elution force on the horizontal axis. The results are shown in FIG. 16.

Figure 16:
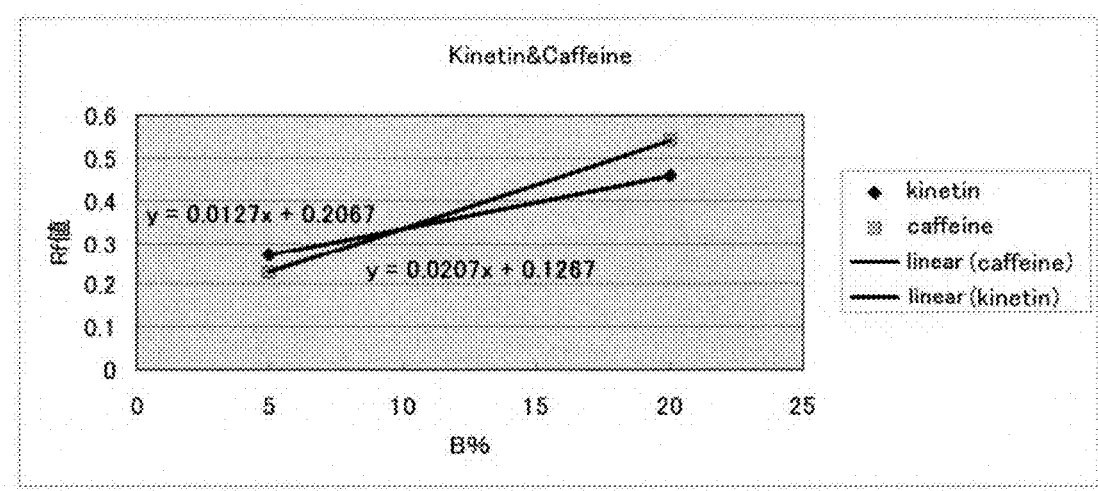
FIG. 16 is a diagram showing a relationship created based on Method (2), in Examples.
Figure 17:
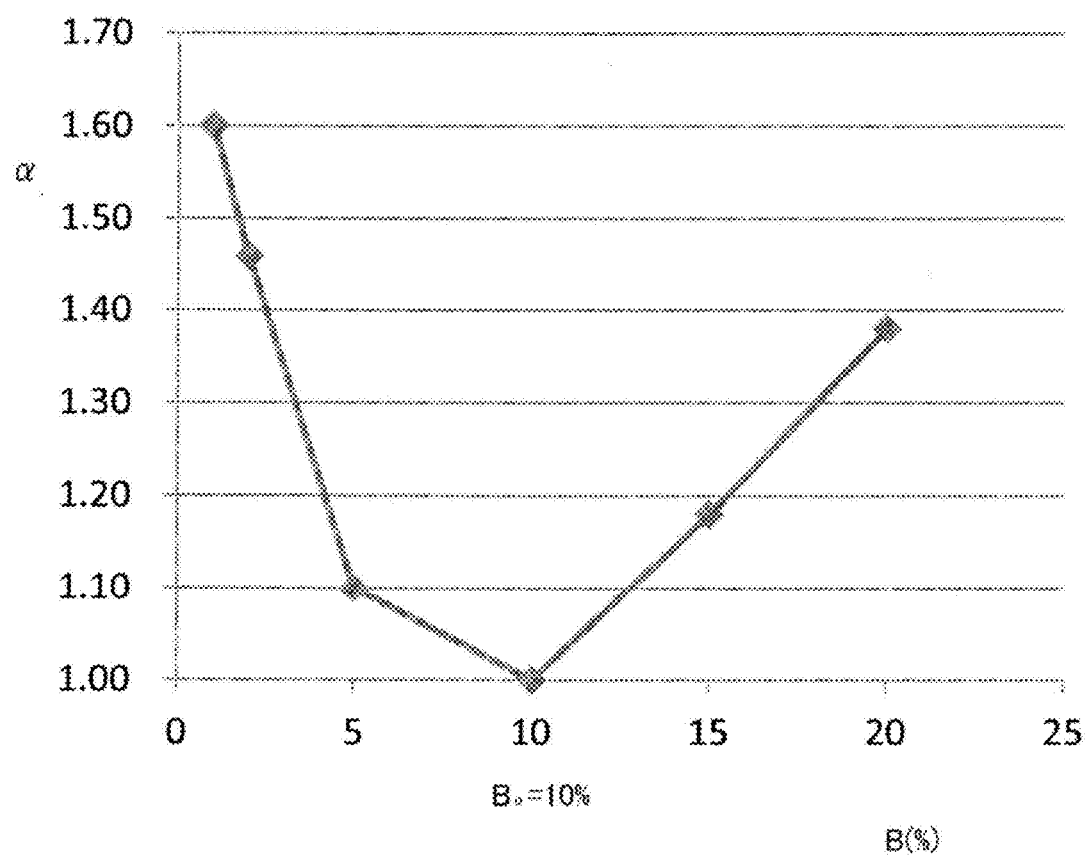
FIG. 17 is a diagram showing a relationship between B and a in Method (2) of Examples.
Figure 18:
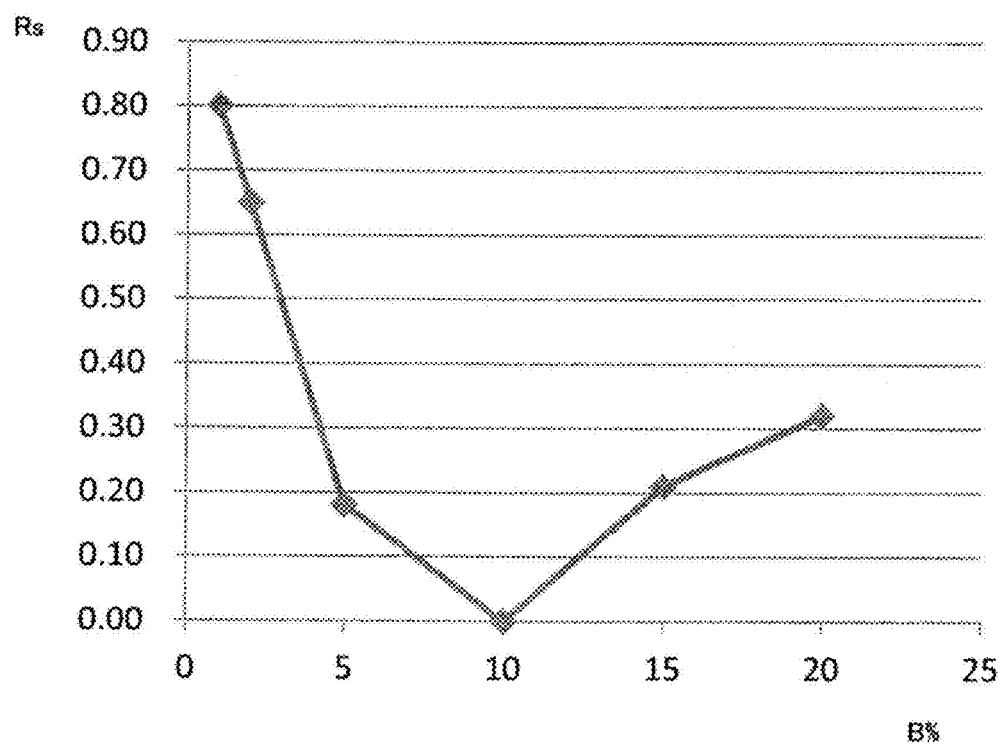
FIG. 18 is a diagram showing a relationship between B and Rs in Method (2) of Examples.

The separation factor $\alpha$ and the separation degree Rs when the relative retention of kinetin had been changed in the two components were calculated based on the calculation formula in FIG. 16. The results are shown in Table 1. In addition, the relationship between the solvent mixing ratio B and the $\alpha$ was shown in FIG. 17, and the relationship between the B and the Rs was shown in FIG. 18.

Rs becomes $\alpha=1$, that is, Rs=0 at a point of intersection of two components, $B_0=10\%$ calculated (by using the theoretical plate number N that is an indicator of column efficiency as 100) from the formula (3), and the B % at which two components are eluted at the same time (=not separated) can be read.

Conventionally uniformly, the relative retention k'=3 was used as the target elution position, and this was sufficiently grounded because a relationship between the separation degree and the elution position (this can also be paraphrased as the time taken for carrying out chromatography or the amount of consumed solvent) is well-balanced, and the satisfactory separation degree is achieved in a relatively short time, and with a small amount of consumed solvent.

However, as in the present Examples, in a case where a relationship between the $R_f$ value and the B % is different for each compound, when $\alpha$ is not sufficiently high for separation of two components at the elution position of k'=3, by performing chromatography under the elution condition that the relative retention was set low, for example, k'=4 to 5, or keeping the retention larger than that, the higher separation degree can be achieved. However, even when the relative retention is set longer, if k'=around 6 or more, the elution of a sample is significantly delayed than normally expected, and takes a long time and a large amount of a solvent, or the sample may not be eluted, therefore, it is desired to set the upper limit of k'=around 6 for the setting.

TABLE 1

| B (volume %) | Kinetin Rf | Kinetin k' | Caffeine Rf | Caffeine k' | α of kinetin and caffeine | Separation degree Rs (N = 100) |
|---|---|---|---|---|---|---|
| 1 | 0.15 | 5.67 | 0.22 | 3.55 | 1.60 | 0.80 |
| 2 | 0.17 | 4.88 | 0.23 | 3.35 | 1.46 | 0.65 |
| 5 | 0.23 | 3.35 | 0.27 | 3.70 | 1.10 | 0.18 |
| 10 | 0.33 | 2.03 | 0.33 | 2.03 | 1.00 | 0 |
| 15 | 0.44 | 1.27 | 0.40 | 1.50 | 1.18 | 0.21 |
| 20 | 0.54 | 0.85 | 0.46 | 1.17 | 1.38 | 0.32 |

At the same time, from the $\alpha$ in Table 1, based on the formula (3), the required theoretical plate number N for achieving Rs=1.25 (that is a value generally recognized as baseline separation) in each k' (B %) corresponding to a specific solvent mixing ratio can be found. Further, with reference to the relationship in FIGS. 9 and 10 between the theoretical plate number N of a column and the load amount g of a sample, the sample load amount chargeable to a column can be found.

That is, the load amount capable of separating a sample in each B % in a case of using a specific column can be found. In the Rs in Table 1, baseline separation 1.25 is not achieved. However, when the sample load amount is reduced, and the chromatography is performed with a sample amount with which N required for the separation can be sufficiently taken, the intended separation degree can be obtained. With a column having a large size, the linear relationship between the theoretical plate number N and the load amount g of a sample is at the higher position (FIG. 10), therefore, when a sample in a predetermined amount is tried to be separated, the appropriate column size can also be easily selected.

When thin-layer chromatography was performed with a mixing ratio of ethyl acetate:methanol of 95:5, two components were separated, further, when the thin-layer chromatography was also performed with a mixing ratio of 80:20, two components were separated. However, when isocratic elution at a point of intersection of two components of 90:10, or gradient elution including a ratio of 90:10 was applied into column chromatography, the predicted separation was not obtained.

Example 2: Investigation by Relational Expression of Japanese Patent Application No. 2015-152510

The horizontal axis B % was converted to B mol %, and a value taking the natural logarithm was plotted on the horizontal axis, the vertical axis $R_f$ value was converted to k' by the formula (2), and a value taking the natural logarithm was plotted on the vertical axis, and the plotted points were connected by straight lines and further linear formulas of those straight lines were drawn. The results are shown in FIG. 19.

Figure 19:
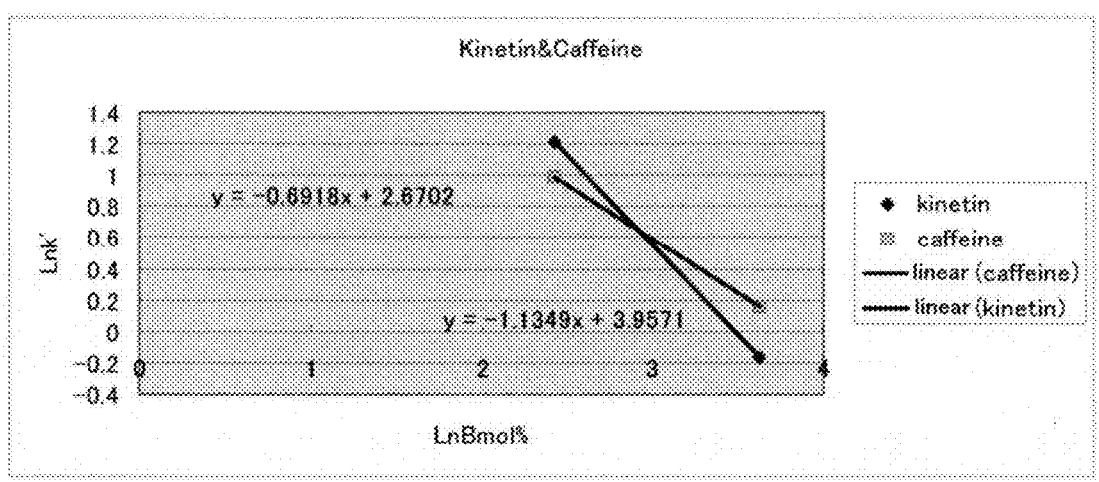
FIG. 19 is a diagram showing a relationship created based on Method (1), in Examples.

When FIG. 19 is also utilized, the solvent ratio that is disadvantageous for separation was found, and by performing column chromatography avoiding the ratio, the higher separation degree can be achieved.

Figure 20:
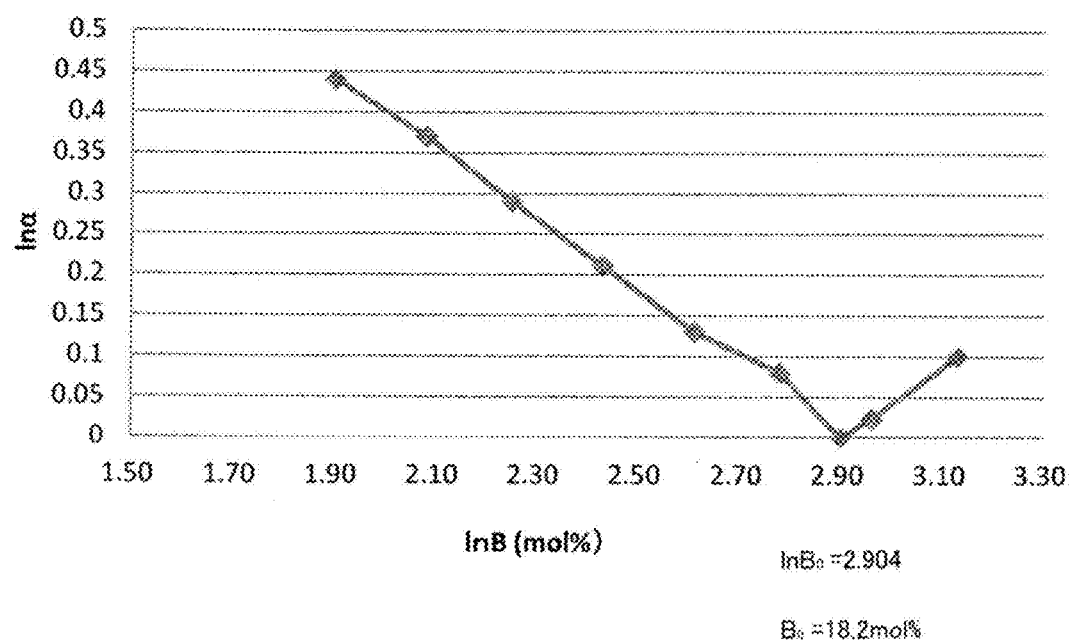
FIG. 20 is a diagram showing a relationship between ln B and ln α in Method (1) of Examples.

In the two components, the separation factor α becomes as in Table 2 when the relative retention of kinetin was changed.

formula (3), and the results were also shown in Table 2. The relationship between the separation degree Rs and the B mol % is shown in FIG. 20, the separation degree became Rs=0 at a point of intersection of two components of $B_0$=18.2%, and the B mol % at which two components are eluted at the same time (=not separated) can be read.

In the formula (3), the required theoretical plate number N for achieving Rs=1.25 that is generally recognized as baseline separation in each k' (B mol %) can be found. There is a relationship of FIGS. 9 and 10 between the theoretical plate number N of a column and the load amount g of a sample. For a column with individual size, by using the data of the relationship of FIGS. 9 and 10, the sample load amount chargeable to a column can be found. That is, the load amount capable of being separated in each B mol % can be found. As to the separation degrees of Table 2, which are mentioned as an example, with changing the B mol % (k'), the baseline separation 1.25 is not achieved, but when the sample load amount is reduced from the relationship of FIG. 9, and the chromatography is performed with a sample amount with which the N required for the separation can be sufficiently taken, the intended separation degree can be achieved. As to a column having a large size, a linear relationship between the theoretical plate number N and the

TABLE 2

| lnB (mol %) | B (mol %) | Kinetin | | Caffeine | | Kinetin and caffeine | | Separation degree Rs |
|---|---|---|---|---|---|---|---|---|
| | | lnk' | k' | lnk' | k' | ln α | α | (N = 100) |
| 1.90 | 6.7 | 1.8 | 6.05 | 1.36 | 3.9 | 0.44 | 1.55 | 0.76 |
| 2.08 | 8 | 1.6 | 4.95 | 1.23 | 3.42 | 0.37 | 1.45 | 0.65 |
| 2.25 | 9.5 | 1.4 | 4.06 | 1.11 | 3.03 | 0.29 | 1.34 | 0.51 |
| 2.43 | 11.4 | 1.2 | 3.32 | 0.99 | 2.69 | 0.21 | 1.23 | 0.36 |
| 2.61 | 13.6 | 1 | 2.7 | 0.87 | 2.39 | 0.13 | 1.14 | 0.22 |
| 2.78 | 16.1 | 0.8 | 2.23 | 0.72 | 2.05 | 0.08 | 1.08 | 0.13 |
| 2.90 | 18.2 | 0.661 | 1.93 | 0.661 | 1.93 | 0 | 1 | 0 |
| 2.96 | 19.3 | 0.6 | 1.82 | 0.624 | 1.87 | 0.024 | 1.02 | 0.03 |
| 3.13 | 22.9 | 0.4 | 1.49 | 0.5 | 1.65 | 0.1 | 1.11 | 0.15 |

Conventionally uniformly, the relative retention k'=3 was used as the target elution position, and this was sufficiently grounded because the relationship between the separation degree and the elution position (this can also be paraphrased as the time taken for carrying out chromatography or the amount of consumed solvent) is well-balanced, and the satisfactory separation degree is achieved in a relatively short time, and with a small amount of consumed solvent. However, as in this example, when the relationship between the ln k' and the ln B mol % is not constant (α is not a constant), in the elution position of k'=3, the α may not be sufficiently high for the separation of two components. In the isocratic chromatography in a case of intersecting at k'=3, the separation cannot be achieved. In such a case, by performing chromatography under the elution condition that the relative retention was set low, for example, k'=4 or 5, or keeping the retention larger than that, the higher separation degree can be achieved. However, even when the relative retention is set longer, if k'=around 6 or more, the elution of a sample is significantly delayed than normally expected, and takes a long time and a large amount of a solvent, or the sample may not be eluted, therefore, it is desired to set the upper limit of k'=around 6 for the setting.

In addition, the separation degree Rs (based on 100 of the theoretical plate number N that is an indicator of column efficiency) was calculated for each B mol % from the load amount g of a sample is at the higher position (FIG. 10), therefore, when a sample in a predetermined amount is tried to be separated, the appropriate column size can also be easily selected.

The examples in which two components intersect are mentioned in the above, but even if two components do not intersect, in the relationship between the Ln α and the Ln B mol %, when two lines are not in parallel (having the same inclination), the α is not constant, therefore, by predicting in advance the solvent ratio and the relative retention k' (elution position), which are advantageous for separation, and by performing column chromatography with the ratio, the higher separation degree can be achieved.

INDUSTRIAL APPLICABILITY

The control device of liquid chromatography in the present disclosure can be suitably performed in liquid chromatography for separation operation in the field of organic chemistry. In particular, the control device can be used for efficiently performing separation in separation operation in experiments and research.

EXPLANATION OF REFERENCES

1 TLC apparatus
2 Silica gel thin layer plate

3 Sample
4 Eluent
5 Container
6 Detector
11 Liquid chromatography system
12 and 13 Container
14 Solenoid valve
15 Mixer
16 Pump
17 Injector
18 Column
20 Fraction collector

The invention claimed is:

1. A liquid chromatography method for separating a mixture of two or more kinds of compounds, comprising the following steps:
   (1) performing at least two thin-layer chromatography or column chromatography steps wherein each of the at least two of said steps is performed for a different mixing ratio from the other;
   (2) creating a relational expression between a mixing ratio and an elution degree of a solvent for each compound in a sample based on results of the step (1); and
   (3) determining an optimum condition based on the relational expression, and performing liquid chromatography,
   wherein the step (3) is performed in a liquid chromatography condition wherein Rs as defined below is more than 1.2,
   wherein $Rs=[N^{1/2}/4][(\alpha-1)/\alpha][k'/(k'+1)]$,
   N represent a theoretical plate number of a column,
   $\alpha=k'_1/k'_2$ and
   $k'_1$ and $k'_2$ represent relative retention for compounds 1 and 2, respectively.

2. The liquid chromatography method according to claim 1, wherein
   the determination of the optimal condition in the step (3) is performed by calculating an elution time and a separation degree from the relational expression obtained in the step (2).

3. The liquid chromatography method according to claim 2, wherein
   the thin-layer chromatography is two-dimensional deployment type thin-layer chromatography.

4. The liquid chromatography method according to claim 3 wherein
   a relationship between a mixing ratio and an elution degree of a solvent creates based on a result of thin-layer chromatography or column chromatography a relational expression between a mixing ratio of an eluent or a gradient pattern of a mixing ratio of an eluent, and an elution time, represented by the following formula (1):

$$\log k' = a \log B + b \quad (1)$$

(wherein k' is a relative retention calculated by the following formula (2):

$$k' = (t_R - t_0)/t_0 \quad (2),$$

B: a solvent ratio, and
   a: a constant determined by a solvent system to be used for elution).

5. The liquid chromatography method according to claim 2 wherein
   a relationship between a mixing ratio and an elution degree of a solvent creates based on a result of thin-layer chromatography or column chromatography a relational expression between a mixing ratio of an eluent or a gradient pattern of a mixing ratio of an eluent, and an elution time, represented by the following formula (1):

$$\log k' = a \log B + b \quad (1)$$

(wherein k' is a relative retention calculated by the following formula (2):

$$k' = (t_R - t_0)/t_0 \quad (2),$$

B: a solvent ratio, and
   a: a constant determined by a solvent system to be used for elution).

6. The liquid chromatography method according to claim 1, wherein
   the thin-layer chromatography is two-dimensional deployment type thin-layer chromatography.

7. The liquid chromatography method according to claim 6 wherein
   a relationship between a mixing ratio and an elution degree of a solvent creates based on a result of thin-layer chromatography or column chromatography a relational expression between a mixing ratio of an eluent or a gradient pattern of a mixing ratio of an eluent, and an elution time, represented by the following formula (1):

$$\log k' = a \log B + b \quad (1)$$

(wherein k' is a relative retention calculated by the following formula (2):

$$k' = (t_R - t_0)/t_0 \quad (2),$$

B: a solvent ratio, and
   a: a constant determined by a solvent system to be used for elution).

8. The liquid chromatography method according to claim 1 wherein
   a relationship between a mixing ratio and an elution degree of a solvent creates based on a result of thin-layer chromatography or column chromatography a relational expression between a mixing ratio of an eluent or a gradient pattern of a mixing ratio of an eluent, and an elution time, represented by the following formula (1):

$$\log k' = a \log B + b \quad (1)$$

(wherein k' is a relative retention calculated by the following formula (2):

$$k' = (t_R - t_0)/t_0 \quad (2),$$

B: a solvent ratio, and
   a: a constant determined by a solvent system to be used for elution).

9. The liquid chromatography method according to claim 1, wherein the liquid chromatography in step (3) is performed avoiding a solvent mixing ratio in the vicinity of the intersection in a diagram of mixing ratios versus elution degree between the mixing ratios of two or more kinds of compounds upon performing the liquid chromatography twice.

10. An information provision method in liquid chromatography for separating a mixture of two or more kinds of compounds, comprising the following steps:
    (1) performing at least two thin-layer chromatography or column chromatography steps wherein each of the at least two of said steps is performed for a different mixing ratio from the other;
    (2) creating a relational expression between a mixing ratio and an elution degree of a solvent for each compound in a sample based on results of the step (1); and (3) providing information concerning chromatography based on the relational expression, wherein the step (3) is performed in a liquid chromatography condition wherein Rs as defined below is more than 1.2, wherein Rs=$[N^{1/2}/4][(\alpha-1)/\alpha][k'/(k'+1)]$, N represent a theoretical plate number of a column, $\alpha=k'_1/k'_2$ and $k'_1$ and $k'_2$ represent relative retention for compounds 1 and 2, respectively.

11. The information provision method according to claim 10, wherein in the step (3), a selectivity factor $\alpha$ represented by $\alpha=k'_1/k'_2$ is calculated, and result predictive information of chromatography is provided based on the selectivity factor $\alpha$.

12. The information provision method according to claim 10, wherein the information is a solvent mixing ratio which avoids the vicinity of the intersection in a diagram of mixing ratios versus elution degree between the mixing ratios of two or more kinds of compounds upon performing the liquid chromatography twice.

13. A liquid chromatographic auxiliary apparatus, comprising:

a calculation formula creation part creating a relationship between a mixing ratio and an elution degree of a solvent for each compound in a sample based on a result of at least two thin-layer chromatography or column chromatography steps wherein each of the at least two of said steps is performed for a different mixing ratio from the other; and a liquid chromatography result prediction part determining an optimum condition of liquid chromatography based on results of the calculation formula creation part, wherein the optimum condition of the liquid chromatography condition is the one where Rs as defined below is more than 1.2, wherein Rs=$[N^{1/2}/4][(\alpha-1)/\alpha][k'/(k'+1)]$, N represent a theoretical plate number of a column, $\alpha=k'_1/k'_2$ and $k'_1$ and $k'_2$ represent relative retention for compounds 1 and 2, respectively.

14. The liquid chromatography auxiliary apparatus according to claim 13, wherein the optimum condition is to perform the liquid chromatography avoiding a solvent mixing ratio in the vicinity of the intersection in a diagram of mixing ratios versus elution degree between the mixing ratios of two or more kinds of compounds upon performing the liquid chromatography twice.

* * * * *